(12) United States Patent
Watts et al.

(10) Patent No.: US 12,623,411 B2
(45) Date of Patent: May 12, 2026

(54) FLEX WRAP CIRCUIT ASSEMBLY TECHNIQUES

(71) Applicant: Oura Health Oy, Oulu (FI)

(72) Inventors: Gary Watts, Oceanside, CA (US); Jonathan Watson, San Diego, CA (US); Kirt Alan Winter, San Diego, CA (US); Avinoam Halpern, Escondido, CA (US); Jose Julio Doval, Escondido, CA (US)

(73) Assignee: Oura Health Oy, Oulu (FI)

( * ) Notice: Subject to any disclaimer, the term of this patent is extended or adjusted under 35 U.S.C. 154(b) by 0 days.

(21) Appl. No.: 18/756,666

(22) Filed: Jun. 27, 2024

(65) Prior Publication Data

US 2026/0001282 A1 Jan. 1, 2026

(51) Int. Cl.
| | |
|---|---|
| *B29C 65/54* | (2006.01) |
| *B29C 65/52* | (2006.01) |
| *B29C 65/78* | (2006.01) |
| *B29L 31/00* | (2006.01) |
| *B29L 31/34* | (2006.01) |

(52) U.S. Cl.
CPC ............ B29C 65/54 (2013.01); B29C 65/524 (2013.01); B29C 65/7808 (2013.01); *B29L 2031/34* (2013.01); *B29L 2031/7096* (2013.01); *B29L 2031/743* (2013.01)

(58) Field of Classification Search
CPC ....... B29L 2031/743; B29L 2031/7096; B29L 2031/34; B29C 65/7808; B29C 65/524; B29C 65/54
See application file for complete search history.

(56) References Cited

U.S. PATENT DOCUMENTS

2024/0081012 A1* 3/2024 Haverinen ........... A61B 5/6826

* cited by examiner

*Primary Examiner* — Vishal I Patel
(74) *Attorney, Agent, or Firm* — ArentFox Schiff LLP

(57) ABSTRACT

Methods, systems, and devices for manufacturing a wearable ring device are described. The manufacturing assembly may rotate, by a rotational component, an inner housing member of the wearable ring device to a radial orientation based on an optical alignment process. A positioning component of the manufacturing assembly may insert and align an optical component of a flexible circuit assembly into at least one aperture of the inner housing member by moving the flexible circuit assembly from a first position adjacent to the inner housing member to a second position on the inner housing member. The manufacturing assembly may secure one or more edges of the flexible circuit assembly onto the inner housing member using a plurality of arms of the positioning component and apply, by an automatic adhesive dispensing device of the manufacturing assembly, a polymeric material to adhere the flexible circuit assembly to the inner housing member.

10 Claims, 12 Drawing Sheets

320

325

330-a

340

315

305

310

335

330-b 330-c

300

Figure 12:
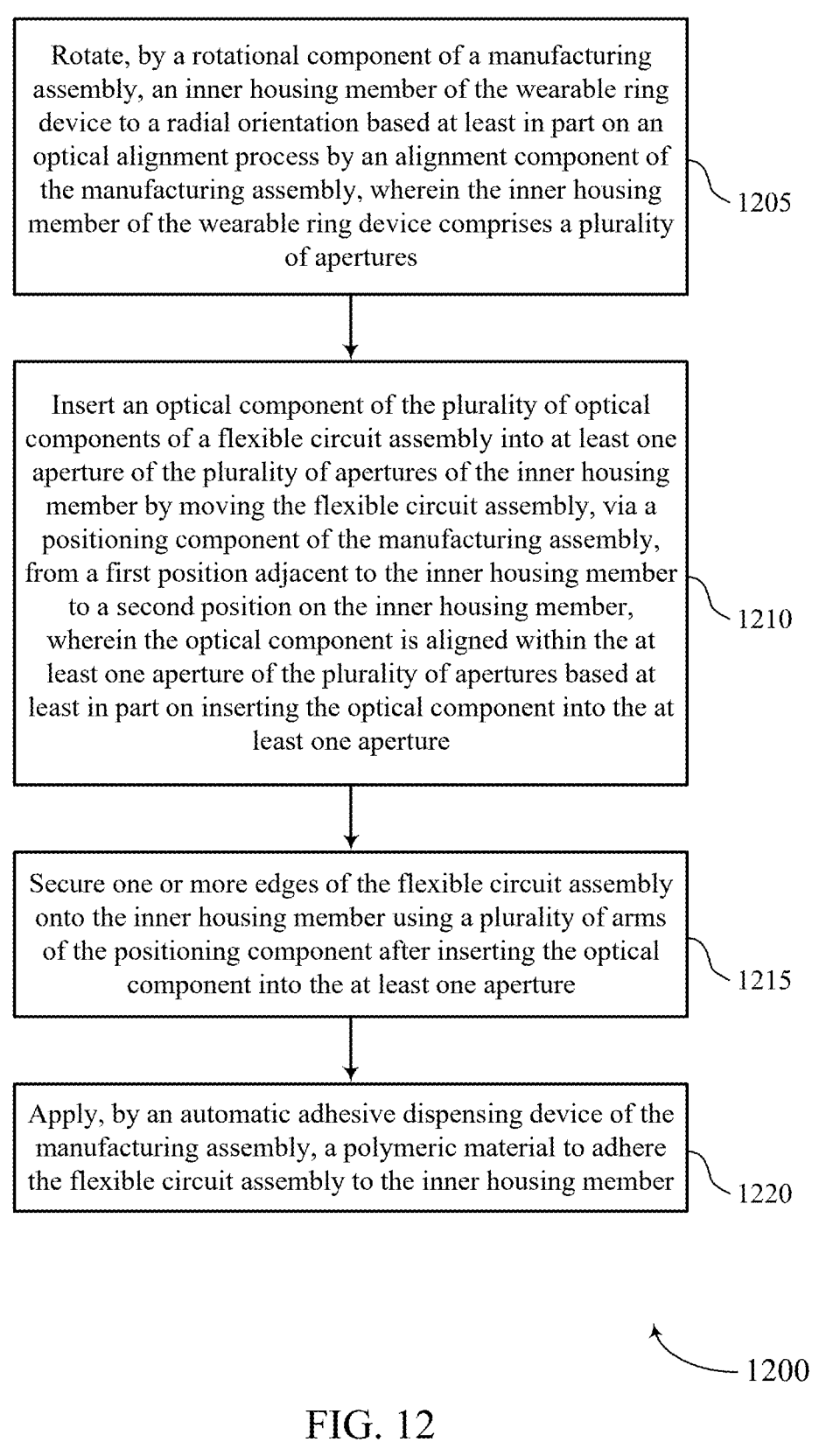

Rotate, by a rotational component of a manufacturing assembly, an inner housing member of the wearable ring device to a radial orientation based at least in part on an optical alignment process by an alignment component of the manufacturing assembly, wherein the inner housing member of the wearable ring device comprises a plurality of apertures

1205

Insert an optical component of the plurality of optical components of a flexible circuit assembly into at least one aperture of the plurality of apertures of the inner housing member by moving the flexible circuit assembly, via a positioning component of the manufacturing assembly, from a first position adjacent to the inner housing member to a second position on the inner housing member, wherein the optical component is aligned within the at least one aperture of the plurality of apertures based at least in part on inserting the optical component into the at least one aperture

1210

Secure one or more edges of the flexible circuit assembly onto the inner housing member using a plurality of arms of the positioning component after inserting the optical component into the at least one aperture

1215

Apply, by an automatic adhesive dispensing device of the manufacturing assembly, a polymeric material to adhere the flexible circuit assembly to the inner housing member

FLEX WRAP CIRCUIT ASSEMBLY TECHNIQUES

FIELD OF TECHNOLOGY

The following relates to wearable devices and data processing, including flex wrap circuit assembly techniques.

BACKGROUND

Some wearable devices may be configured to collect data from users. In some cases, some wearable devices may perform various actions, such as providing certain health insights to users, based on acquired physiological data in order to assist the user with improving their overall health.

Methods for manufacturing wearable devices may include manually assembling each individual component of the wearable device. However, techniques used in such manufacturing processes may lead to irregularities in shape, may be costly, may be difficult to position to create a consistent product, among other potential deficiencies.

BRIEF DESCRIPTION OF THE DRAWINGS

FIG. 12 shows a flowchart illustrating methods that support flex wrap circuit assembly techniques in accordance with aspects of the present disclosure.

DETAILED DESCRIPTION

Figure 1:
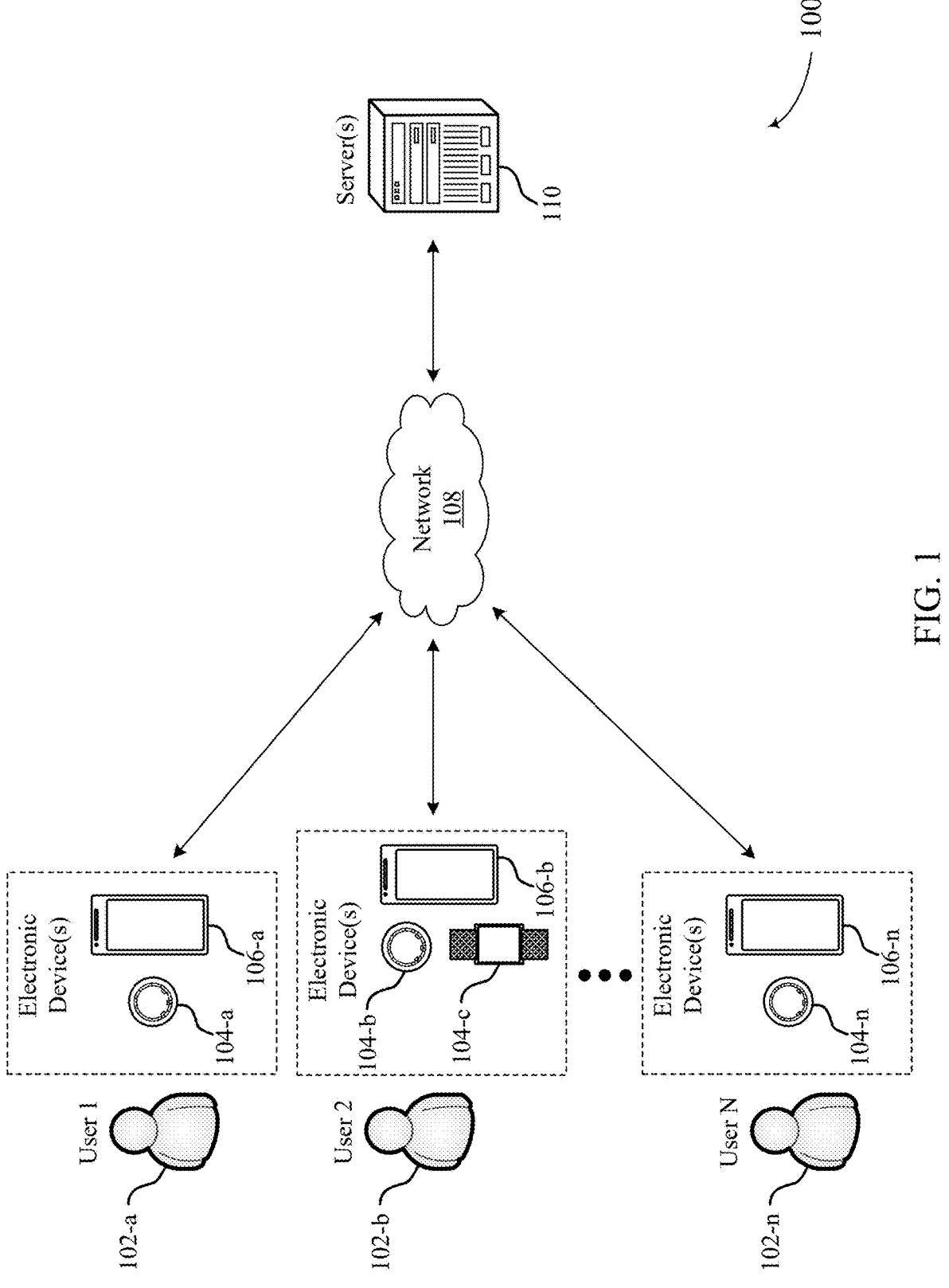
FIG. 1 illustrates an example of a system that supports flex wrap circuit assembly techniques in accordance with aspects of the present disclosure.

An individual may use a wearable device (e.g., a wearable ring device) to collect, monitor, and track physiological data of the individual based on sensor measurements of the wearable ring device. Examples of physiological data may include temperature data, heart rate data, photoplethysmography (PPG) data, and the like. The physiological data collected, monitored, and tracked via the wearable ring device may be used to gain health insights about the user.

In some cases, one or more sensors of the wearable ring device may be located between an inner housing of the wearable ring device and an outer housing of the wearable ring device. Separate optical components (e.g., lenses, reflectors, prisms, microprisms, micro lenses arrays, angular filters, and the like) may be included in the wearable ring device to enhance the functionality of the one or more sensor optoelectronic components (e.g., components such as light emitting elements and light detecting elements).

However, integrating the optical components into the wearable ring device with adequate accuracy and robustness may be challenging due to the size of the components and the scale of the integration. The optical components may need to be manually and properly positioned within the wearable ring devices to align with the one or more sensor optoelectronic components or apertures or other physical features of the wearable device. For example, the optical components may need to be manually and properly positioned within the wearable ring devices to align with the one or more sensor optoelectronic components, resulting in manufacturing complexities or, if misaligned, manufacturing deformities. In such cases, manufacturing the optical components to adhere to the wearable ring device may be expensive and time consuming due to the need to accurately and manually place the optical components onto or within the wearable ring device.

In this regard, inefficiently manufacturing the wearable ring device may result in inaccurate placement of the optical components that may result in unreliable physiological measurements, increased battery consumption, increased processing power at the wearable, among other technical challenges. Further, a size of the optical components may depend on a size of the wearable ring device and/or a size of the one or more sensors, resulting in additional manufacturing complexities. In some cases, inaccurately manufacturing wearable ring device may result in manufacturing deformities that may require additional manufacturing to remove the deformities (e.g., polishing, etching, sanding), thereby increasing the cost of production and increasing the waste associated with discarding the inaccurately manufactured wearable ring device.

Accordingly, aspects of the present disclosure may support an automated manufacturing process that reduces manufacturing complexities and deformities. For example, the automated manufacturing process may automate the alignment of the optical components to the optical paths of the wearable ring device (e.g., the inner ring shell). The manufacturing system wraps a flexible circuit including the optical components to the inner ring shell automatically and provides an ample amount of wrapping force to ensure the correct radial spacing of the optical components. The manufacturing system includes a structure that holds the flexible circuit, a structure that holds the inner ring shell, one or more arms that pushes the flexible circuit onto the inner ring shell and secures the ends of the flexible circuit onto the inner ring shell, and an arm that attaches the flexible circuit in place to the inner ring shell via an adhesive material (e.g., polymeric material, UV curable glue, etc.).

The manufacturing process includes circumferential alignment of the optical components by first positioning the flexible circuit onto a holding device (e.g., the structure that holds the flexible circuit) and placing the inner ring shell onto a rotating mandrel. The position of the inner ring shell to the mandrel is controlled via a locking mechanism or by using a camera or other visual sensor techniques to determine the inner ring shell position on the mandrel. When the inner ring shell and flexible circuit are in position, the apparatus (e.g., the one or more arms) then moves one end of the flexible circuit and then the other end of the flexible circuit to the inner ring shell. The radial position of the flex circuit is controlled by the automatic positioning of the wrapping tool relative to the inner ring shell, thereby reducing manufacturing complexities and deformities. By making the manufacturing process automatic, the optical components and the one or more sensors may be aligned, thus enabling the wearable ring device to be fabricated with a reduced likelihood of manufacturing deformities and enabling the manufacturing process to be completed with increased efficiency, increased speed, and reduced manufacturing complexity.

Accordingly, manufacturing the wearable ring device via the automatic manufacturing process may result in high-volume production of optics arrays (e.g., optical components) manufactured on the inner ring shell and a low-cost solution to the assembly. That is, the automated manufacturing process may enhance optical functionality by depositing the optical components onto the inner ring shell and then aligning the optical components with the one or more sensors during the manufacturing process, which may introduce increased signal quality and stronger signals, thereby reducing the power consumption and increasing the battery life of the wearable ring device.

Although the examples described herein are related to manufacturing a wearable ring device, it should be understood that the described techniques and devices may be applied to manufacturing processes related to other devices or items, such as other wearables (e.g., watches, bands), or other electronic devices that are not considered wearables.

Aspects of the disclosure are initially described in the context of systems supporting physiological data collection from users via wearable devices. Aspects are then described in the context of manufacturing systems. Aspects of the disclosure are further illustrated by and described with reference to apparatus diagrams, system diagrams, and flowcharts that relate to flex wrap circuit assembly techniques.

FIG. 1 illustrates an example of a system 100 that supports flex wrap circuit assembly techniques in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, blood oxygen saturation (SpO2), blood sugar levels (e.g., glucose metrics), and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols. Moreover, in some cases, the wearable device 104 and the user device 106 may be included within (or make up) the same device. For example, in some cases, the wearable device 104 may be configured to execute an application associated with the wearable device 104, and may be configured to display data via a GUI.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs) (e.g., vertical cavity surface-emitting lasers (VCSELs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-*a* may be associated with a wearable device 104-*a* (e.g., ring 104-*a*) and a user device 106-*a*. In this example, the ring 104-*a* may collect physiological data associated with the user 102-*a*, including temperature, heart rate, HRV, respiratory rate, and the like. In some aspects, data collected by the ring 104-*a* may be input to a machine learning classifier, where the machine learning classifier is configured to determine periods of time that the user 102-*a* is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-*a* via a GUI of the user device 106-*a*. Sleep stage classification may be used to provide feedback to a user 102-*a* regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-*a* via the wearable device 104-*a*. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g. in a hypothetical culture with 12 day "weeks," 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support techniques for flex wrap circuit assembly techniques. For example, the system 100 may support a manufacturing process via a manufacturing assembly that uses automatic alignment and assembly of the flexible circuit to an inner ring component of a wearable device (e.g., wearable device 104-*a*). The manufacturing assembly may include a structure (e.g., chuck) that holds the flexible circuit, a mandrel (e.g., rotational component) that holds the inner ring, pneumatically controlled arms (e.g., a plurality of arms) that push the flexible circuit onto the inner ring, and a robotic arm (e.g., an automatic adhesive dispensing device of the manufacturing assembly) that attaches the flex circuit in place with UV cured glue or similar adhesive material.

For example, the manufacturing assembly may include the mandrel configured to rotate the inner ring (e.g., inner housing member) of a wearable ring device to a radial orientation and an alignment component configured to position the inner ring in the radial orientation based on an optical alignment process. The manufacturing assembly may also include the chuck (e.g., positioning component) that is configured to move the flexible circuit from a first position adjacent to the inner ring to a second position on the inner ring such that an optical component of a plurality of optical components of the flexible circuit is inserted into at least one aperture of the plurality of apertures of the inner shell. The optical component may be aligned within the at least one aperture of the plurality of apertures based on inserting the optical component into the at least one aperture. In some cases, the chuck may include the pneumatically controlled arms that include one or more actuating features that are configured to secure one or more edges of the flexible circuit onto the inner shell. In some cases, the manufacturing assembly may include the robotic arm that is configured to apply a polymeric material to adhere the flexible circuit to the inner shell.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
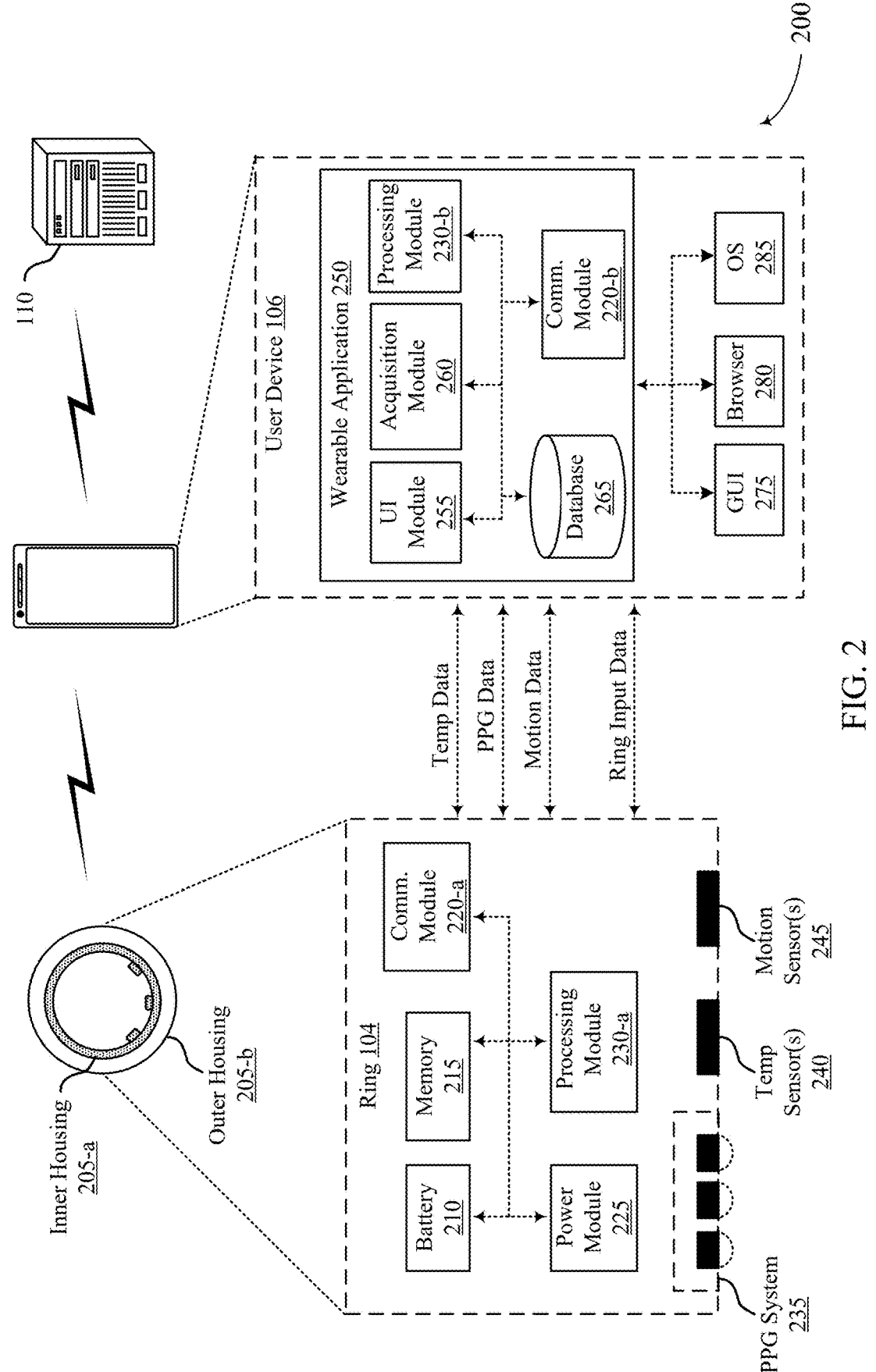
FIG. 2 illustrates an example of a system that supports flex wrap circuit assembly techniques in accordance with aspects of the present disclosure.

FIG. 2 illustrates an example of a system 200 that supports flex wrap circuit assembly techniques in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels (SpO2), blood sugar levels (e.g., glucose metrics), and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-a and an outer housing 205-b. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-a, a memory 215, a communication module 220-a, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using adhesives, wraps, clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG light emitting diodes (LEDs). In some implementations, the inner housing 205-a component may be molded onto the outer housing 205-b. For example, the inner housing 205-a may include a polymer that is molded (e.g., injection molded) to fit into an outer housing 205-b metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-a may communicate with the memory 215. The memory 215 may include computer-readable instructions that, when executed by the processing module 230-a, cause the processing module 230-a to perform the various functions attributed to the processing module 230-a herein. In some implementations, the processing module 230-a (e.g., a microcontroller) may include additional features associated with other modules, such as communication functionality provided by the communication module 220-a (e.g., an integrated Bluetooth Low Energy transceiver) and/or additional onboard memory 215.

The communication module 220-a may include circuits that provide wireless and/or wired communication with the user device 106 (e.g., communication module 220-b of the user device 106). In some implementations, the communication modules 220-a, 220-b may include wireless communication circuits, such as Bluetooth circuits and/or Wi-Fi circuits. In some implementations, the communication modules 220-a, 220-b can include wired communication circuits, such as Universal Serial Bus (USB) communication circuits. Using the communication module 220-a, the ring 104 and the user device 106 may be configured to communicate with each other. The processing module 230-a of the ring may be configured to transmit/receive data to/from the user device 106 via the communication module 220-a. Example data may include, but is not limited to, motion data, temperature data, pulse waveforms, heart rate data, HRV data, PPG data, and status updates (e.g., charging status, battery charge level, and/or ring 104 configuration settings). The processing module 230-a of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during charging, and under voltage during discharge. The power module 225 may also include electro-static discharge (ESD) protection.

The one or more temperature sensors 240 may be electrically coupled to the processing module 230-a. The temperature sensor 240 may be configured to generate a temperature signal (e.g., temperature data) that indicates a temperature read or sensed by the temperature sensor 240. The processing module 230-a may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-a) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-a may use to determine the temperature. As another example, in cases where the temperature sensor 240 includes a passive sensor, the processing module 230-a (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-*a* may sample the user's temperature over time. For example, the processing module 230-*a* may sample the user's temperature according to a sampling rate. An example sampling rate may include one sample per second, although the processing module 230-*a* may be configured to sample the temperature signal at other sampling rates that are higher or lower than one sample per second. In some implementations, the processing module 230-*a* may sample the user's temperature continuously throughout the day and night. Sampling at a sufficient rate (e.g., one sample per second) throughout the day may provide sufficient temperature data for analysis described herein.

The processing module 230-*a* may store the sampled temperature data in memory 215. In some implementations, the processing module 230-*a* may process the sampled temperature data. For example, the processing module 230-*a* may determine average temperature values over a period of time. In one example, the processing module 230-*a* may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-*a* near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-*a* may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-*a* may sample the sensors at different rates and average/store different values for the different sensors. In some implementations, the processing module 230-*a* may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/ different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/ external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-*a* may sample the PPG signal and determine a user's pulse waveform based on the PPG signal. The processing module 230-*a* may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-*a* may control one or both of the optical transmitters to transmit light while sampling the PPG signal generated by the optical receiver. In some implementations, the processing module 230-*a* may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-*a* may store the pulse waveform in memory 215 in some implementations. The processing module 230-*a* may process the pulse waveform as it is generated and/or from memory 215 to determine user physiological parameters described herein.

The processing module 230-*a* may determine the user's heart rate based on the pulse waveform. For example, the processing module 230-*a* may determine heart rate (e.g., in beats per minute) based on the time between peaks in the pulse waveform. The time between peaks may be referred to as an interbeat interval (IBI). The processing module 230-*a* may store the determined heart rate values and IBI values in memory 215.

The processing module 230-*a* may determine HRV over time. For example, the processing module 230-*a* may determine HRV based on the variation in the IBIs. The processing module 230-*a* may store the HRV values over time in the memory 215. Moreover, the processing module 230-*a* may determine the user's respiratory rate over time. For example, the processing module 230-*a* may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-*a* may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BM1160 inertial micro electro-mechanical system (MEMS) sensor that may measure angular rates and accelerations in three perpendicular axes.

The processing module 230-*a* may sample the motion signals at a sampling rate (e.g., 50 Hz) and determine the motion of the ring 104 based on the sampled motion signals. For example, the processing module 230-*a* may sample acceleration signals to determine acceleration of the ring 104. As another example, the processing module 230-*a* may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/ available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-b, a communication module 220-b, and a storage module (e.g., database 265) configured to store application data.

In some cases, the wearable device 104 and the user device 106 may be included within (or make up) the same device. For example, in some cases, the wearable device 104 may be configured to execute the wearable application 250, and may be configured to display data via the GUI 275.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the ring 104 may be manufactured using techniques described herein. For example, the ring 104 may be manufactured by rotating, by a rotational component of a manufacturing assembly, an inner housing member (e.g., inner housing 205-a) of the wearable ring device (e.g., ring 104) to a radial orientation based on an optical alignment process by an alignment component of the manufacturing assembly. The inner housing member of the wearable ring device may include one or more apertures.

The manufacturing process for fabricating ring 104 may further include inserting an optical component of the plurality of optical components (e.g., one or more sensors from PPG system 235) of a flexible circuit assembly into at least one aperture of the plurality of apertures of the inner housing member by moving the flexible circuit assembly, via a positioning component of the manufacturing assembly, from a first position adjacent to the inner housing member to a second position on the inner housing member. In such cases, the optical component is aligned within the at least one aperture of the plurality of apertures after inserting the optical component into the at least one aperture. The manufacturing process may include securing one or more edges of the flexible circuit assembly onto the inner housing member using a plurality of arms of the positioning component after inserting the optical component into the at least one aperture and apply, by an automatic adhesive dispensing device of the manufacturing assembly, a polymeric material to adhere the flexible circuit assembly to the inner housing member.

Figure 3:
FIG. 3 shows an example of a manufacturing assembly in a first position that supports flex wrap circuit assembly techniques in accordance with aspects of the present disclosure.

FIG. 3 shows an example of a manufacturing assembly 300 in a first position that supports flex wrap circuit assembly techniques in accordance with aspects of the present disclosure. The manufacturing assembly 300 may be used to manufacture one or more devices as described in the system 100 and the system 200. In particular, the manufacturing assembly 300 illustrates a first step in the manufacturing process to manufacture a wearable ring device, as described with reference to FIGS. 1 and 2.

In some systems, manufacturing the wearable ring device may be performed via a manual operation. However, manually integrating optical components into the wearable ring device with adequate accuracy and robustness may be challenging due to the size of the components and the scale of the integration. Manually and properly positioning the optical components within the wearable ring device to align with the one or more sensor optoelectronic components within the apertures may result in manufacturing complexities or, if misaligned, manufacturing deformities. In such cases, manually manufacturing the optical components to adhere to the wearable ring device may be expensive and time consuming due to the need to accurately place the optical components onto or within the wearable ring device.

Accordingly, the manufacturing assembly 300 illustrates an automatic manufacturing process to manufacture a wearable ring device. By making the manufacturing process automatic, the optical components and the one or more sensors may be aligned, thus enabling the wearable ring device to be fabricated with a reduced likelihood of manufacturing deformities and enabling the manufacturing process to be completed with increased efficiency, increased speed, and reduced manufacturing complexity, thereby resulting in wearable ring devices that perform more accurate physiological measurements.

An inner housing member 310 may be mounted onto a rotational component 305 of the manufacturing assembly 300. In some cases, the inner housing member 310 may include or be made from a metallic material or an opaque material and may include a plurality of apertures 315. A flexible circuit assembly 335 may be mounted onto a positioning component 325. The flexible circuit assembly 335 may include the optical components 340 (e.g., light emitting components, light detecting components) mounted onto a flexible substrate such as a flexible printed circuit board (PCB). The flexible circuit assembly 335 may also include other electronic components such as processors, antennas, and/or light blocking components. For example, in addition to optics, the flexible circuit assembly 335 may include features such as mechanical spacers and stray light blockers (e.g., light blocking components).

The flexible circuit assembly 335 may be mounted on the positioning component 325 via a protrusion (e.g., a notch, a chip, a bump, or the like) on a first side of the flexible circuit assembly 335 opposite of the second side of the flexible circuit assembly 335 that includes the optical components 340. The protrusion may be mounted onto the positioning component 325 via a vacuum seal. In some cases, the positioning component 325 may include a recessed portion that is configured to fit the protrusion within the recessed portion and maintain the flexible circuit assembly 335 onto the positioning component 325.

The flexible circuit assembly 335 may be positioned relative to an inner housing member 310. One or more of the positioning component 325 may prevent the positioning component 325 from initially rotating or changing a position and/or orientation of the flexible circuit assembly 335. In some cases, the protrusion may include location features such that the positioning component 325 may determine the position and/or orientation of the flexible circuit assembly 335 relative to the rotational component 305. In some examples, a same size positioning component 325 may be able to accommodate varying sizes (e.g., lengths, widths, depths etc.) of the flexible circuit assembly 335.

The rotational component 305 may be configured to rotate the inner housing member 310 of a wearable ring device to a radial orientation to align an aperture 315 of the inner housing member 310 with an optical component 340 of the flexible circuit assembly 335. The rotational component 305 rotates the inner housing member 310 to the radial orientation based on an optical alignment process of the manufacturing assembly 300. In such cases, the optical alignment process may align an aperture 315 of the inner housing member 310 to an optical component 340 of the flexible circuit assembly 335 via an alignment component 320.

The alignment component 320 may be configured to position the inner housing member 310 in the radial orientation based on the optical alignment process. For example, the position of the inner housing member 310 relative to the rotational component 305 is controlled via a locking mechanism. The locking mechanism may be configured to lock the inner housing member 310 in the radial orientation after rotating the inner housing member 310 to the radial orientation. In such cases, locking the inner housing member 310 in the radial orientation aligns the aperture 315 of the inner housing member 310 to an optical component 340 of the flexible circuit assembly 335, as described herein.

In some cases, the alignment component 320 may be an example of a video component. The video component may be configured to determine an initial radial orientation of the inner housing member 310 relative to the optical component 340 of the flexible circuit assembly 335. In such cases, the inner housing member 310 may be rotated to the radial orientation after determining the initial radial orientation of the inner housing member 310. For example, the position of the inner housing member 310 relative to the rotational component 305 is controlled by using a camera to determine the position of the inner housing member 310 on the rotational component 305.

The positioning component 325 may be configured to move the flexible circuit assembly 335 from a first position adjacent to the inner housing member 310 to a second position on the inner housing member 310 such that the optical component 340 of the flexible circuit assembly 335 is inserted into the aperture 315 of the inner housing member 310, as described with reference to FIG. 4. The positioning component 325 may include a plurality of arms 330. For example, the positioning component 325 may include a first arm 330-a, a second arm 330-b, and a third arm 330-b. Each of the arms 330 may include actuating features that are configured to secure the flexible circuit assembly 335 onto the inner housing member 310, as described herein with reference to FIGS. 5 through 7.

Figure 4:
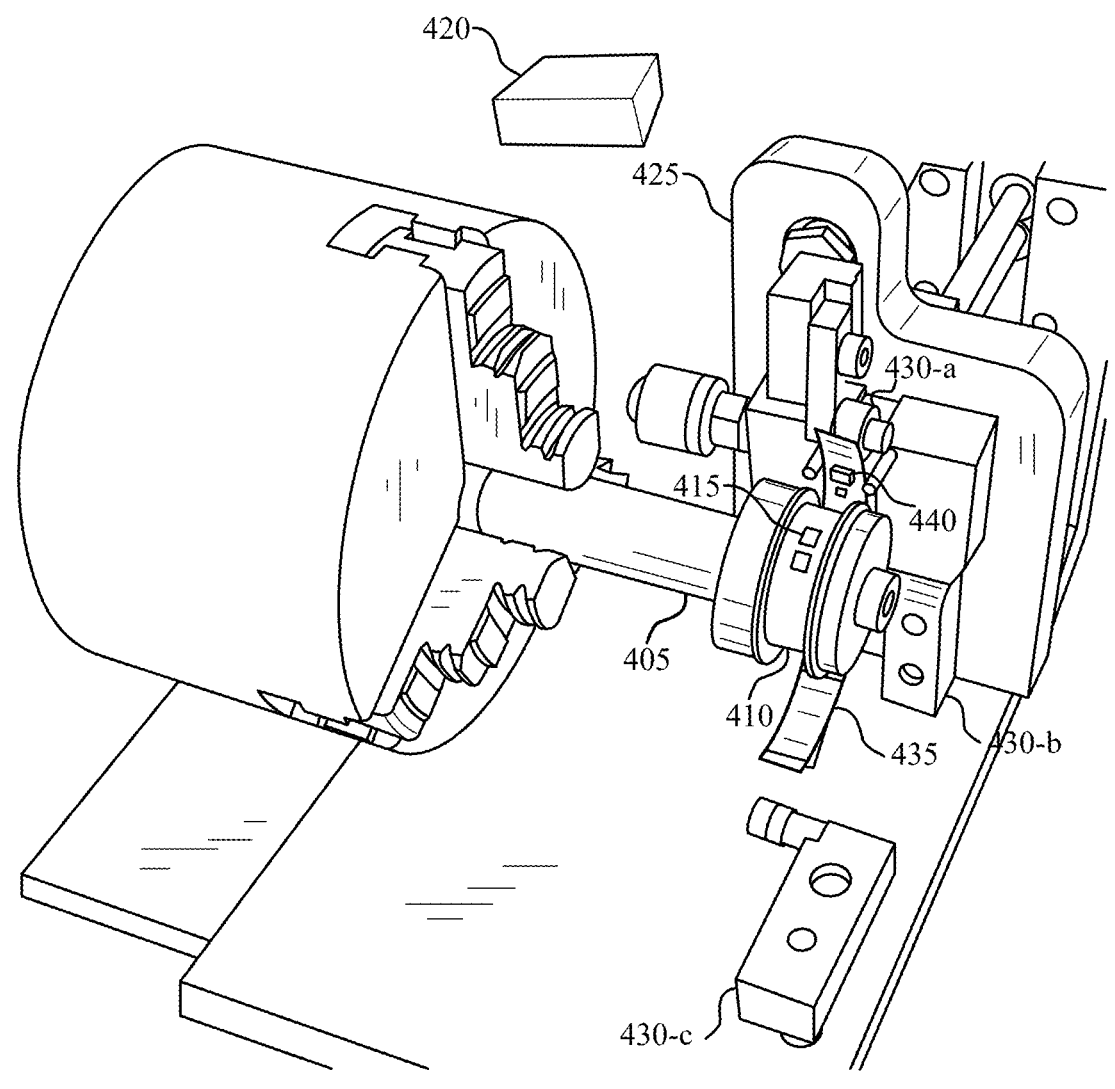
FIG. 4 shows an example of a manufacturing assembly in a second position that supports flex wrap circuit assembly techniques in accordance with aspects of the present disclosure.

FIG. 4 shows an example of a manufacturing assembly 400 in a second position that supports flex wrap circuit assembly techniques in accordance with aspects of the present disclosure. In particular, the manufacturing assembly 400 illustrates a second step in the manufacturing process to manufacture a wearable ring device, as described with reference to FIGS. 1 through 3.

The positioning component 425 moves the flexible circuit assembly 435 from the first position adjacent to the inner housing member 410 to a second position on the inner housing member 410 to insert the optical component 440 of the flexible circuit assembly 435 into the aperture 415 of the inner housing member 410. In such cases, the optical component 440 is aligned within the at least one aperture of the plurality of apertures 415 in response to inserting the optical component 440 into the aperture 415.

For example, the positioning component 425 is configured to be advanced from the first position adjacent to the inner housing member 410 to the second position. Inserting the optical component 440 of the flexible circuit assembly 435 into the aperture 415 of the inner housing member 410 occurs in response to advancing the positioning component 425 of the manufacturing assembly 400 in a forward direction (e.g., horizontal direction). For example, the positioning component 425 moves forward in a horizontal direction to position the flexible circuit assembly 435 onto the inner housing member 410 after the inner housing member 410 is aligned with the flexible circuit assembly 435, via the optical alignment process, as described with reference to FIG. 3.

In such cases, the manufacturing assembly 400 may advance the positioning component 425 from the first position adjacent to the inner housing member 410 to the second position to insert the optical component 440 of the flexible circuit assembly 435 into the aperture 415 of the inner housing member 410. The rotational component 405 may remain stationary via the locking mechanism as the positioning component 425 is advanced forward. In some cases, the alignment component 420 may determine the position of the positioning component 425 relative to the rotational component 405 as the positioning component 425 is advanced forward towards the rotational component 405 (e.g., the inner housing member 410). The arms 430 of the positioning component may remain stationary as the positioning component 425 is advanced from the first position adjacent to the inner housing member 410 to the second position.

Figure 5:
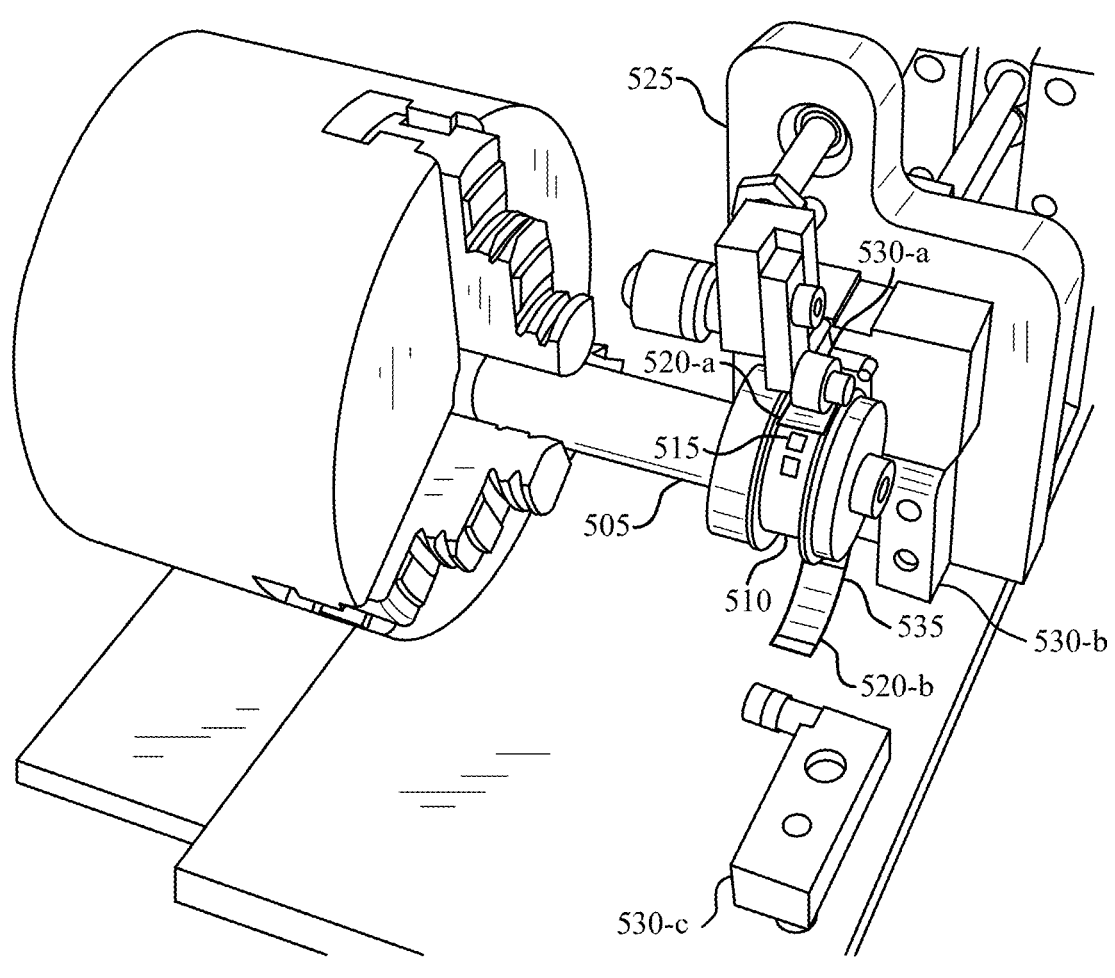
FIG. 5 shows an example of a manufacturing assembly using a first arm that supports flex wrap circuit assembly techniques in accordance with aspects of the present disclosure.

FIG. 5 shows an example of a manufacturing assembly 500 using a first arm 520-a that supports flex wrap circuit assembly techniques in accordance with aspects of the present disclosure. In particular, the manufacturing assembly 500 illustrates a third step in the manufacturing process to manufacture a wearable ring device, as described with reference to FIGS. 1 through 4.

The first arm 530-*a* of the positioning component 525 may include a first actuating feature of the one or more actuating features that is configured to position a first end 520-*a* of the one or more edges of the flexible circuit assembly 535 onto the inner housing member 510. The first arm 530-*a* may be advanced in a first direction to move the first end 520-*a* from the first position adjacent to the inner housing member 510 to the second position on the inner housing member 510. For example, the first arm 530-*a* may be advanced forward (e.g., in a horizontal direction) to attach the first end 520-*a* of the flexible circuit assembly 535 to the inner housing member 510. In such cases, the first arm 530-*a* may secure the first end 520-*a* of the flexible circuit assembly 535 onto the inner housing member 510 after the optical component is inserted into the aperture 515 of the inner housing member 510.

After the first arm 530-*a* moves forward to attach the first end 520-*a* of the flexible circuit assembly 535 onto the inner housing member 510, the manufacturing assembly 500 may then adhere the first end 520-*a* of the flexible circuit assembly 535 onto the inner housing member 510 by applying a polymeric material (e.g., an adhesive material). For example, the manufacturing assembly 500 may apply a UV glue and cure the first end 520-*a* to the inner housing member 510 in order to tack the first end 520-*a* of the flexible circuit assembly 535 in place on the inner housing member 510.

The manufacturing assembly 500 may create a seal between the first end 520-*a* and the inner housing member 510. For example, the first end 520-*a* may be integrated into the inner housing member 510 such that the interface between the inner housing member 510 and the first end 520-*a* is removed and the structure is sealed. The first end 520-*a* may be adhered to the inner housing member 510 before proceeding to the next step, as described with reference to FIG. 6. While the first end 520-*a* is being attached to the inner housing member 510 via the first arm 530-*a*, the second arm 530-*b*, the third arm 530-*c*, the rotational component 505, and the positioning component 525 may remain stationary.

Figure 6:
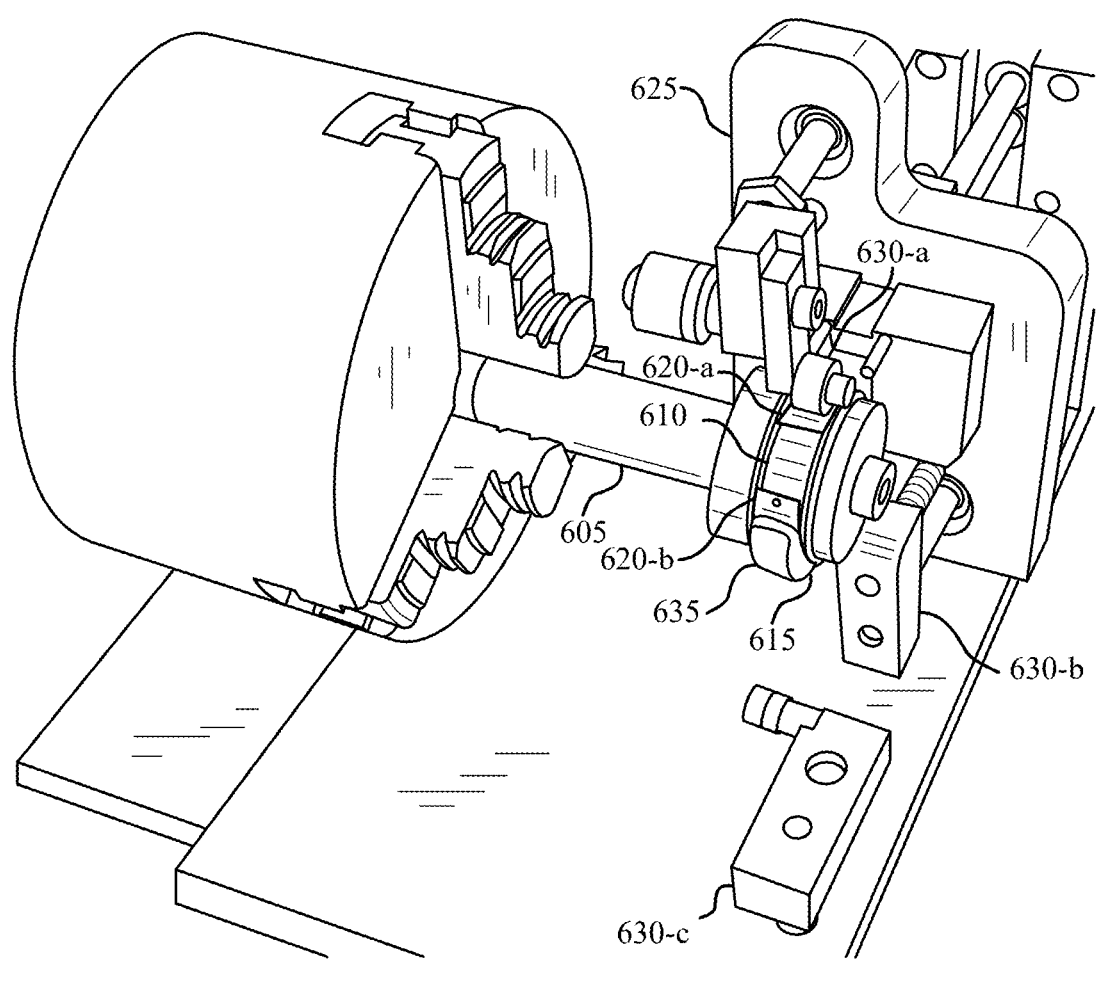
FIG. 6 shows an example of a manufacturing assembly using a second arm that supports flex wrap circuit assembly techniques in accordance with aspects of the present disclosure.

FIG. 6 shows an example of a manufacturing assembly 600 using a second arm 630-*b* that supports flex wrap circuit assembly techniques in accordance with aspects of the present disclosure. In particular, the manufacturing assembly 600 illustrates a fourth step in the manufacturing process to manufacture a wearable ring device, as described with reference to FIGS. 1 through 5.

The second arm 630-*b* may include a second actuating feature of the one or more actuating features that is configured to position a middle portion 615 of the flexible circuit assembly 635 onto the inner housing member 610. For example, the second arm 630-*b* may be advanced in the first direction to move the middle portion 615 from the first position adjacent to the inner housing member 610 to the second position on the inner housing member 610. The second arm 630-*b* may advance forward (e.g., in a horizontal direction) to position the middle portion 615 of the flexible circuit assembly 635 onto the inner housing member 610 and to continue wrapping the flexible circuit assembly 635 around the inner housing member 610.

In such cases, the second arm 630-*b* may position the middle portion 615 of the flexible circuit assembly 635 onto the inner housing member 610. The second arm 630-*b* may extend underneath the flexible circuit assembly 635 to wrap the dangling end (e.g., the second end 620-*b*) around the inner housing member 610 and position the middle portion 615 onto the inner housing member 610. In some cases, the second arm 630-*b* may extend in a forward direction to align with the first arm 630-*a*. In some examples, the second arm 630-*b* may extend further in the forward direction to extend past the first arm 630-*a*. While the middle portion 615 is being attached to the inner housing member 510 via the second arm 630-*b*, the first arm 630-*a*, the third arm 630-*c*, the rotational component 605, and the positioning component 625 may remain stationary.

Figure 7:
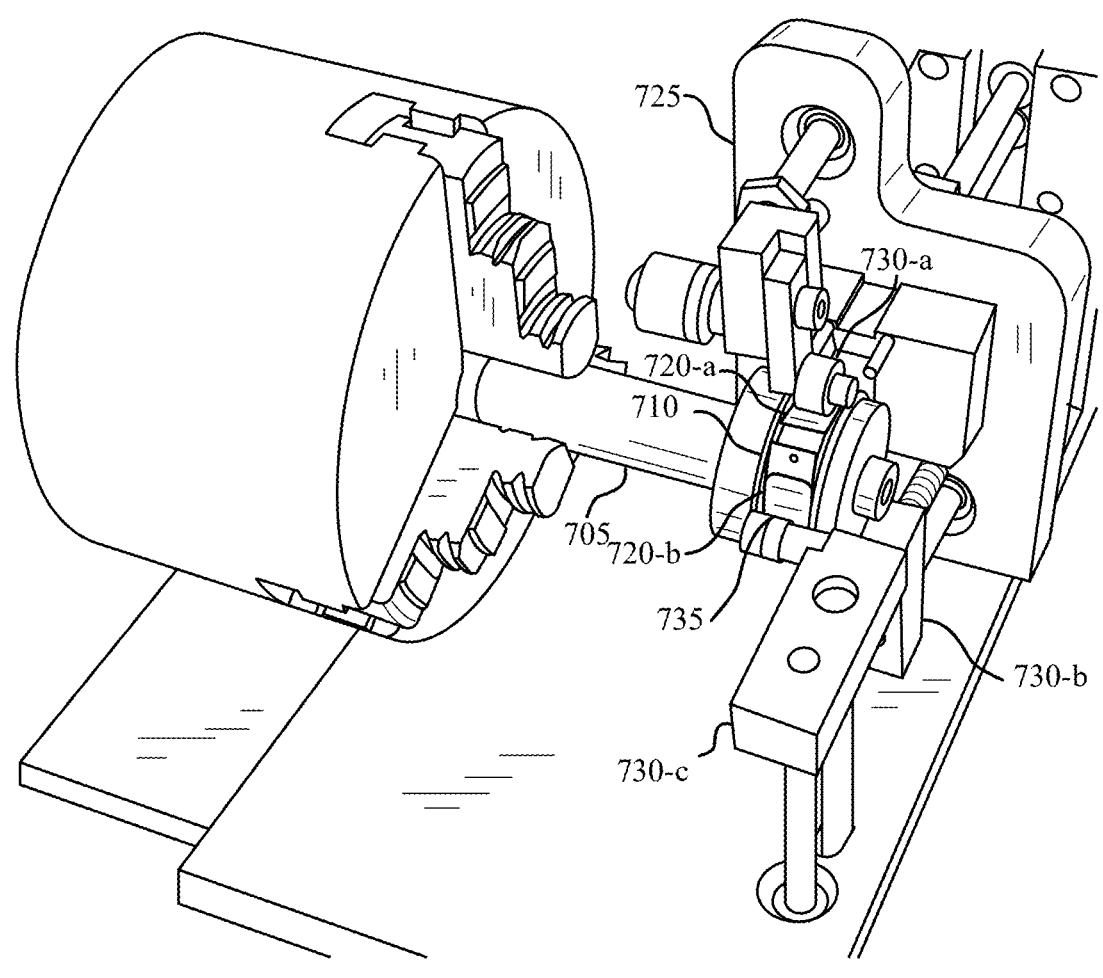
FIG. 7 shows an example of a manufacturing assembly using a third arm that supports flex wrap circuit assembly techniques in accordance with aspects of the present disclosure.

FIG. 7 shows an example of a manufacturing assembly 700 using a third arm that supports flex wrap circuit assembly techniques in accordance with aspects of the present disclosure. In particular, the manufacturing assembly 700 illustrates a fifth step in the manufacturing process to manufacture a wearable ring device, as described with reference to FIGS. 1 through 6.

The third arm 730-*c* may include a third actuating feature of the one or more actuating features that is configured to position a second end 720-*b* of the one or more edges of the flexible circuit assembly 735 onto the inner housing member 710. For example, the third arm 730-*c* may be advanced in a second direction perpendicular to the first direction to move the second end 720-*b* from the first position adjacent to the inner housing member 710 to the second position on the inner housing member 710.

The third arm 730-*c* may move up in a vertical direction to position the second end 720-*b* onto the inner housing member 710 and to fully wrap the flexible circuit assembly 735 around the inner housing member 710. The third arm 730-*c* may secure the second end 720-*b* of the flexible circuit assembly 735 onto the inner housing member 710 after inserting the optical component of the flexible circuit assembly 735 into the aperture of the inner housing member 710.

After the third arm 730-*c* moves in the vertical direction to attach the second end 720-*b* of the flexible circuit assembly 735 onto the inner housing member 710, the manufacturing assembly 700 may adhere the second end 720-*b* of the flexible circuit assembly 735 onto the inner housing member 710 by applying a polymeric material (e.g., an adhesive material). For example, the manufacturing assembly 700 may apply a UV glue to the second end 720-*b* and cure the second end 720-*b* to the inner housing member 710 in order to tack the second end 720-*b* in place on the inner housing member 710. In some cases, the second end 720-*b* may include a recessed portion configured to hold the polymeric material on the second end 720-*b* and adhere the second end 720-*b* onto the inner housing member 710.

The manufacturing assembly 700 may create a seal between the second end 720-*b* and the inner housing member 710. For example, the second end 720-*b* may be integrated into the inner housing member 710 such that the interface between the inner housing member 710 and the second end 720-*b* is removed and the structure is sealed. The second end 720-*b* may be adhered to the inner housing member 710 before proceeding to the next step, as described with reference to FIG. 8. While the second end 720-*b* is being attached to the inner housing member 710 via the third arm 720-*c*, the second arm 730-*b*, the first arm 730-*a*, the rotational component 705, and the positioning component 725 may remain stationary.

In some cases, a battery of the flexible circuit assembly 735 may be positioned near the second end 720-*b*. In such cases, the second end 720-*b* may be pre-formed to include a curved surface such that the second end 720-*b* and the battery may conform to the curved surface of the inner housing member 710. Although the examples described herein are related to manufacturing a wearable ring device (e.g. via a curved surface of the inner housing member 710), it should be understood that the described techniques and devices may be applied to manufacturing processes related to other devices or items, such as other wearables (e.g., watches, bands), other electronic devices that are not considered wearables, or other flat and/or planar surfaces (e.g., patches).

The second end 720-b may be sealed to the inner housing member 710 after the amount of tension and/or force is applied to fully wrap the flexible circuit assembly 735 around the inner housing member 710. For example, the first end 720-a may be secured to the inner housing member 710 such that the second arm 730-b and the third arm 730-c may wrap the flexible circuit assembly 735 around the inner housing member 710 with ample tension to position the flexible circuit assembly 735 onto the inner housing member 710 without any bumps, creases, and/or gaps between the flexible circuit assembly 735 and the inner housing member 710.

The automatic assembly processing may enable the correct amount of tension and/or force to be applied to the flexible circuit assembly 735 in order to fabricate the wearable ring device with a reduced likelihood of manufacturing deformities and enabling the manufacturing process to be completed with increased efficiency, increased speed, and reduced manufacturing complexity. Applying the flex tension on flexible circuit assembly 735 may determine the distance between the optical component of the flexible circuit assembly 735 and the inner housing member 710. In such cases, the automatic manufacturing assembly 700 may precisely and reliably place the flexible circuit assembly 735 onto the inner housing member 710 to properly place of the optical components that are mounted to the flexible circuit assembly 735 with respect to the apertures in the inner housing member 710, thereby resulting in reliable physiological measurements.

Figure 8:
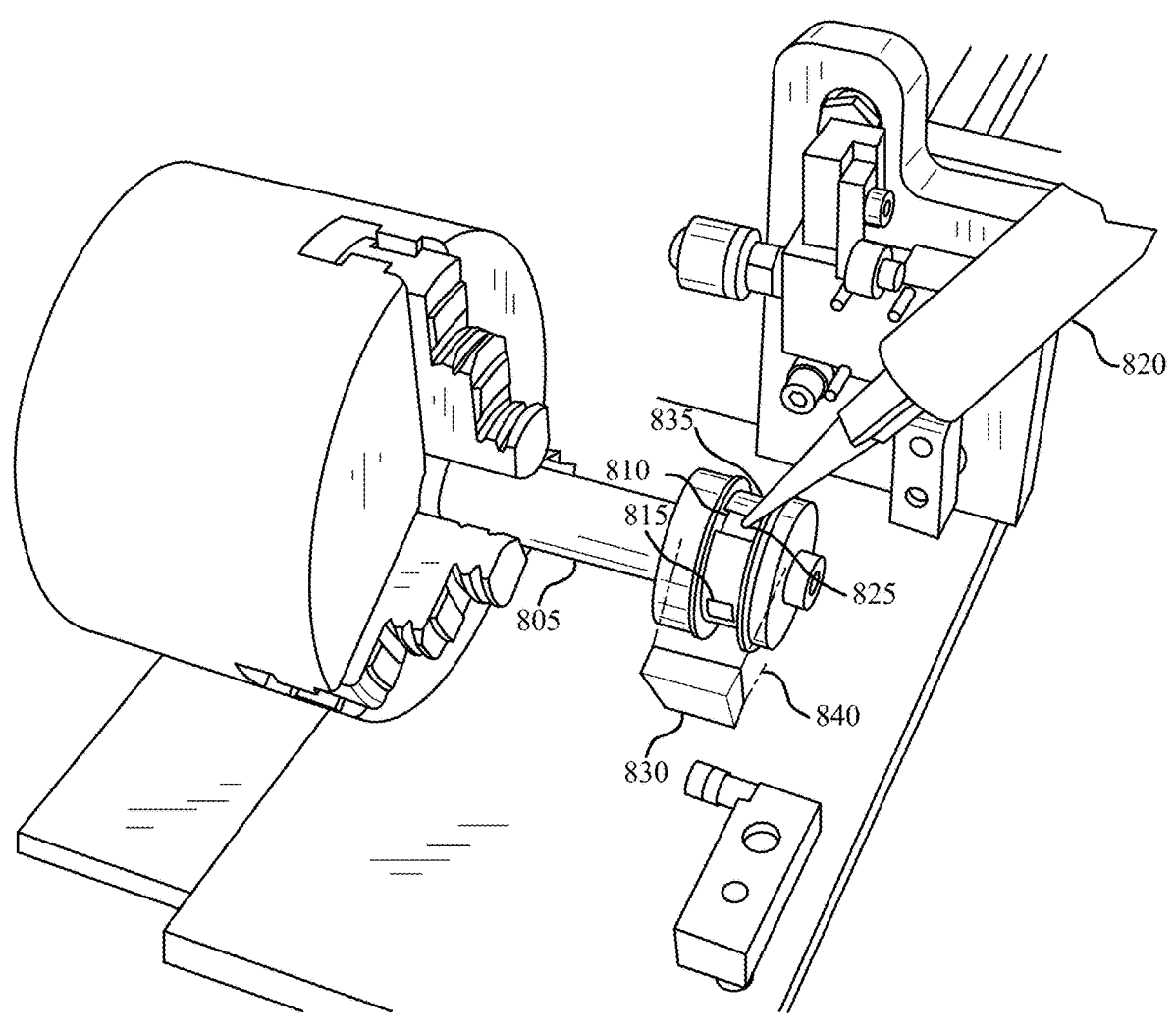
FIG. 8 shows an example of a manufacturing assembly using a dispensing device that supports flex wrap circuit assembly techniques in accordance with aspects of the present disclosure.

FIG. 8 shows an example of a manufacturing assembly 800 using a dispensing device that supports flex wrap circuit assembly techniques in accordance with aspects of the present disclosure. In particular, the manufacturing assembly 800 illustrates a sixth step in the manufacturing process to manufacture a wearable ring device, as described with reference to FIGS. 1 through 7.

The manufacturing assembly 800 may include an automatic dispensing device 820 that is configured to apply a polymeric material 825 to adhere the flexible circuit assembly 835 to the inner housing member 810. The automatic dispensing device 820 may dispense a transparent glue (e.g., polymeric material 825) onto the flexible circuit assembly 835. As described herein, an optical interface between the flexible circuit assembly 835 and the inner housing member 810 may be made by the polymeric material 825. The automatic dispensing device 820 may coat the flexible circuit assembly 835 with the polymeric material 825.

The rotational component 805 may rotate the inner housing member 810 to position a portion of the flexible circuit assembly 835 under the automatic dispensing device 820 after the flexible circuit assembly 835 is deposited on and/or around the inner housing member 810. For example, the rotational component 805 may rotate the inner housing member 810 while the automatic dispensing device 820 applies the polymeric material 825. The polymeric material 825 is applied all over the flexible circuit assembly 835 as the inner housing member 810 rotates. In such cases, the rotational component 805 may rotate the inner housing member 810 at a fixed speed and/or rotational frequency while applying the polymeric material 825 to adhere the flexible circuit assembly 835 to the inner housing member 810.

Applying the polymeric material 825 may fill in the edges between the inner housing member 810 and the flexible circuit assembly 835. For example, the polymeric material 825 may weep around the sides of the flexible circuit assembly 835 to fully seal the flexible circuit assembly 835 to the inner housing member 810. In such cases, the automatic dispensing device 820 may fill the space between the flexible circuit assembly 835 and the inner housing member 810 with the polymeric material 825. In some examples, the polymeric material 825 may fill the space between the plurality of optical components of the flexible circuit assembly 835 such that stray light may be blocked effectively. The automatic dispensing device 820 may inject the polymeric material 825 over the flexible circuit assembly 835 such that the polymeric material 825 contacts the flexible circuit assembly 835.

The polymeric material 825 may be an example of a lower and/or medium viscosity material to flow in and around the areas of the flexible circuit assembly 835. The polymeric material may be an example of an adhesive material, a ultraviolet (UV) curable material (e.g., glue), a thermal adhesive material, and the like. In some cases, the polymeric material 825 may be an example of an epoxy material. In such cases, the epoxy material may include an opaque (e.g., black) material or a transparent (e.g., clear) material. The polymeric material 825 may be an example of a layer of material that includes optical properties that propagate the light between the optical components. In some cases, the polymeric material 825 in combination with a reflective material of the plurality of optical components may improve the battery life and increase the signal quality of the PPG signal.

In some cases, the manufacturing assembly 800 may fix the flexible circuit assembly 835 to the inner housing member 810 by UV curing. In such cases, the manufacturing assembly 800 may adhere the flexible circuit assembly 835 to the inner housing member 810 such that the plurality of optical components may be aligned with the plurality of apertures. For example, the rotational component 805 may position a portion of the flexible circuit assembly 835 under the light source 830 after the flexible circuit assembly 835 is deposited on and/or around the inner housing member 810, after the polymeric material 825 is applied, or both.

The light source 830 is configured to apply a light 840 to the flexible circuit assembly 835 to create a seal between the flexible circuit assembly 835 and the inner housing member 810. The rotational component 805 may rotate the inner housing member 810 while the light source 830 applies the light 840 to the flexible circuit assembly 835. For example, the light 840 is applied all over the flexible circuit assembly 835 as the inner housing member 810 rotates. In such cases, the rotational component 805 may rotate the inner housing member 810 at a fixed speed and/or rotational frequency while applying the light 840 to the flexible circuit assembly 835 to cure the flexible circuit assembly 835 to the inner housing member 810. Applying the light 840 may fully cure the wearable ring device.

The manufacturing assembly 800 may apply a light source 830 to the flexible circuit assembly 835 to create a seal between the flexible circuit assembly 835 and the inner housing member 810. For example, the light source 830 may apply UV light 840 to the UV curable material (e.g., polymeric material 825). In such cases, the flexible circuit assembly 835 may be integrated into the inner housing member 810 such that the interface between the flexible circuit assembly 835 and the inner housing member 810 is removed and the structure (e.g., the wearable ring device) is sealed.

Figure 9:
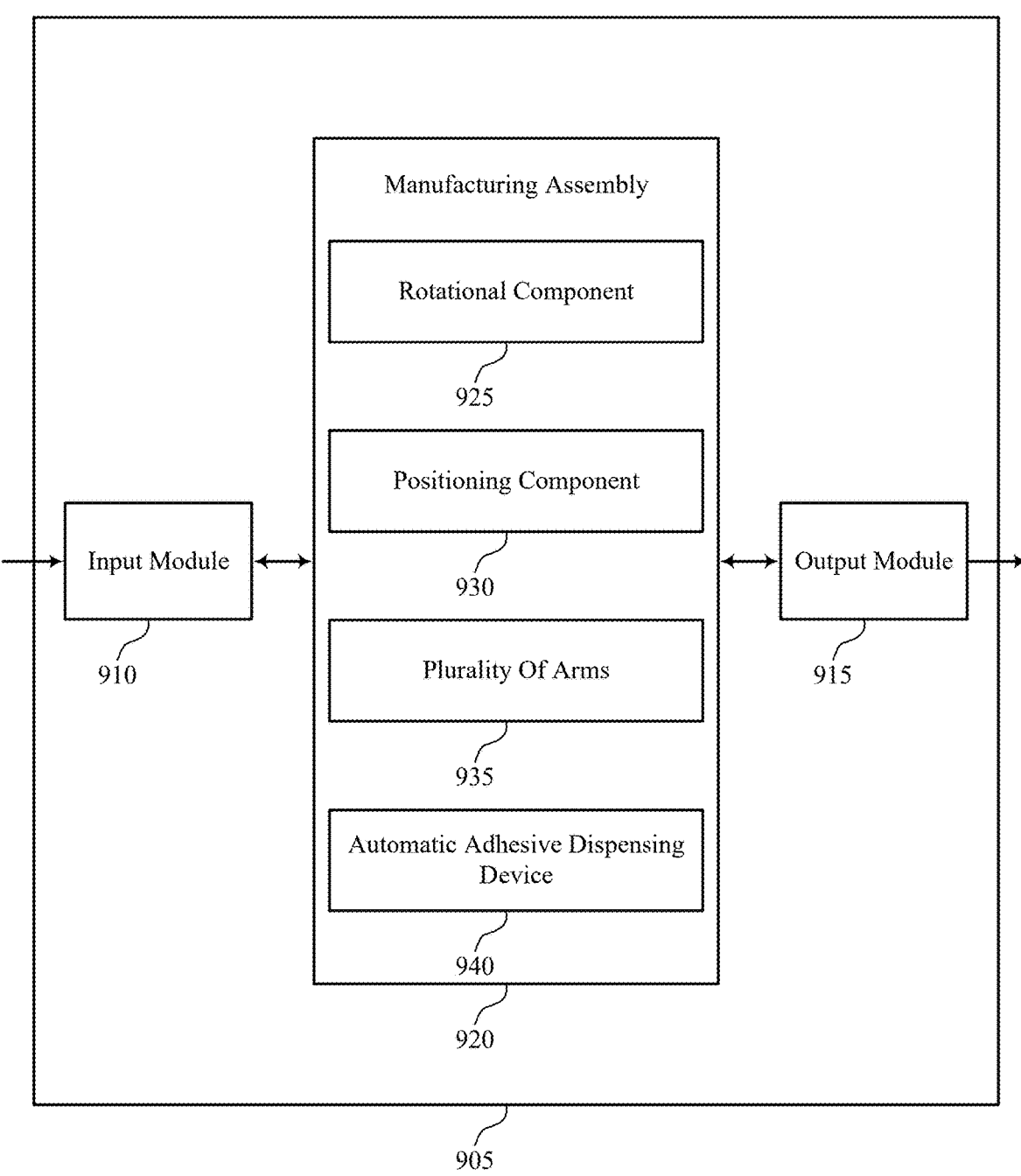
FIG. 9 shows a block diagram of a system that supports flex wrap circuit assembly techniques in accordance with aspects of the present disclosure.

FIG. 9 shows a block diagram 900 of a system 905 that supports flex wrap circuit assembly techniques in accordance with aspects of the present disclosure. The system 905 may include an input module 910, an output module 915, and a manufacturing assembly 920. The system 905, or one of more components of the system 905 (e.g., the input module 910, the output module 915, the manufacturing assembly 920), may include at least one processor, which may be coupled with at least one memory, to support the described techniques. Each of these components may be in communication with one another (e.g., via one or more buses).

The input module 910 may provide a means for receiving information such as packets, user data, control information, or any combination thereof associated with various information channels (e.g., control channels, data channels, information channels related to illness detection techniques). Information may be passed on to other components of the system 905. The input module 910 may utilize a single antenna or a set of multiple antennas.

The output module 915 may provide a means for transmitting signals generated by other components of the system 905. For example, the output module 915 may transmit information such as packets, user data, control information, or any combination thereof associated with various information channels (e.g., control channels, data channels, information channels related to illness detection techniques). In some examples, the output module 915 may be co-located with the input module 910 in a transceiver module. The output module 915 may utilize a single antenna or a set of multiple antennas.

For example, the manufacturing assembly 920 may include a rotational component 925, a positioning component 930, a plurality of arms 935, an automatic adhesive dispensing device 940, or any combination thereof. In some examples, the manufacturing assembly 920, or various components thereof, may be configured to perform various operations (e.g., receiving, monitoring, transmitting) using or otherwise in cooperation with the input module 910, the output module 915, or both. For example, the manufacturing assembly 920 may receive information from the input module 910, send information to the output module 915, or be integrated in combination with the input module 910, the output module 915, or both to receive information, transmit information, or perform various other operations as described herein.

The rotational component 925 may be configured as or otherwise support a means for rotating, by a rotational component of a manufacturing assembly, an inner housing member of the wearable ring device to a radial orientation based at least in part on an optical alignment process by an alignment component of the manufacturing assembly, wherein the inner housing member of the wearable ring device comprises a plurality of apertures. The positioning component 930 may be configured as or otherwise support a means for inserting an optical component of the plurality of optical components of a flexible circuit assembly into at least one aperture of the plurality of apertures of the inner housing member by moving the flexible circuit assembly, via a positioning component of the manufacturing assembly, from a first position adjacent to the inner housing member to a second position on the inner housing member, wherein the optical component is aligned within the at least one aperture of the plurality of apertures based at least in part on inserting the optical component into the at least one aperture. The plurality of arms 935 may be configured as or otherwise support a means for securing one or more edges of the flexible circuit assembly onto the inner housing member using a plurality of arms of the positioning component after inserting the optical component into the at least one aperture. The automatic adhesive dispensing device 940 may be configured as or otherwise support a means for applying, by an automatic adhesive dispensing device, a polymeric material to adhere the flexible circuit assembly to the inner housing member.

Figure 10:
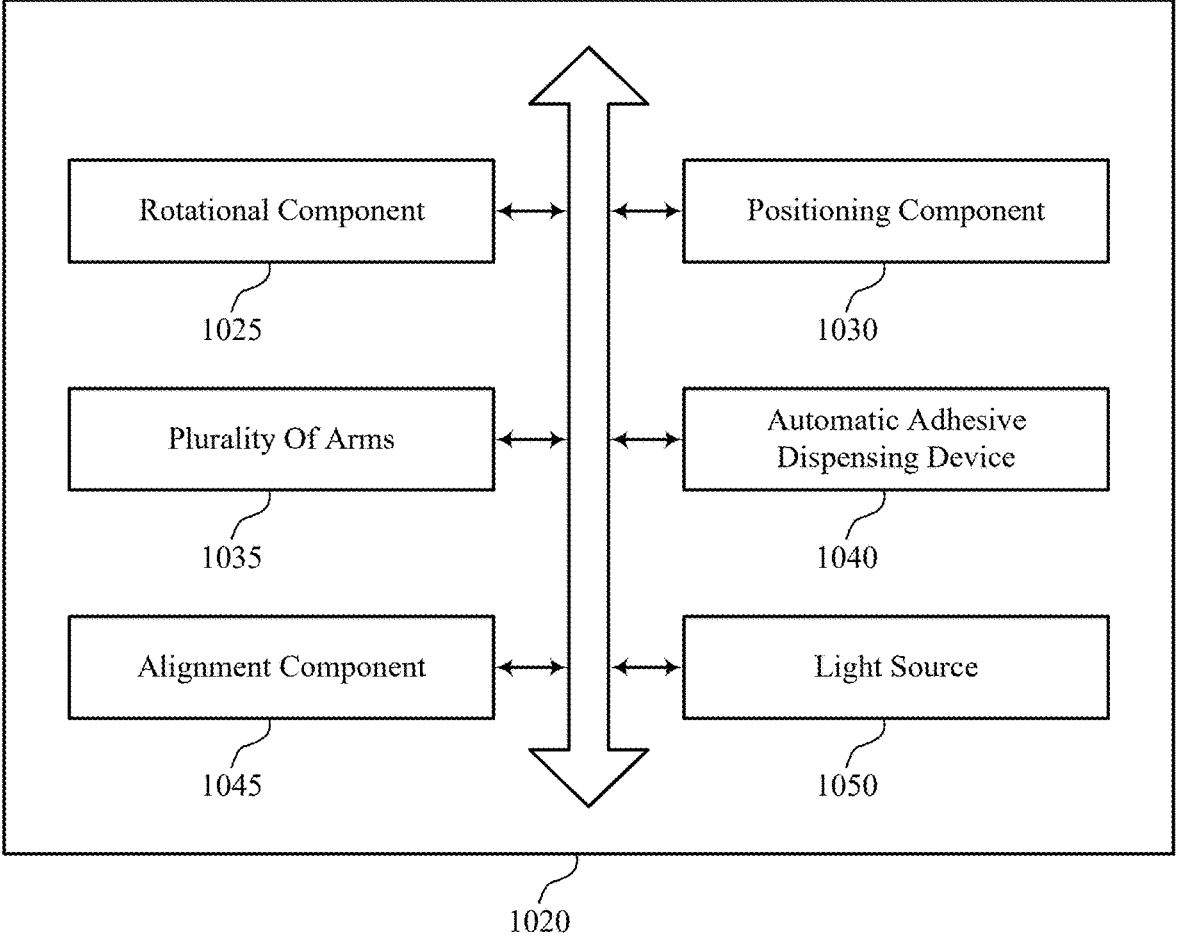
FIG. 10 shows a block diagram of a system that supports flex wrap circuit assembly techniques in accordance with aspects of the present disclosure.

FIG. 10 shows a block diagram 1000 of a manufacturing assembly 1020 that supports flex wrap circuit assembly techniques in accordance with aspects of the present disclosure. The manufacturing assembly 1020 may be an example of aspects of a manufacturing assembly, as described herein. The manufacturing assembly 1020, or various components thereof, may be an example of means for performing various aspects of flex wrap circuit assembly techniques as described herein. For example, the manufacturing assembly 1020 may include a rotational component 1025, a positioning component 1030, a plurality of arms 1035, an automatic adhesive dispensing device 1040, an alignment component 1045, a light source 1050, or any combination thereof.

Each of these components, or components of subcomponents thereof (e.g., one or more processors, one or more memories), may communicate, directly or indirectly, with one another (e.g., via one or more buses).

The rotational component 1025 may be configured as or otherwise support a means for rotating, by a rotational component of a manufacturing assembly, an inner housing member of the wearable ring device to a radial orientation based at least in part on an optical alignment process by an alignment component of the manufacturing assembly, wherein the inner housing member of the wearable ring device comprises a plurality of apertures. The positioning component 1030 may be configured as or otherwise support a means for inserting an optical component of the plurality of optical components of a flexible circuit assembly into at least one aperture of the plurality of apertures of the inner housing member by moving the flexible circuit assembly, via a positioning component of the manufacturing assembly, from a first position adjacent to the inner housing member to a second position on the inner housing member, wherein the optical component is aligned within the at least one aperture of the plurality of apertures based at least in part on inserting the optical component into the at least one aperture. The plurality of arms 1035 may be configured as or otherwise support a means for securing one or more edges of the flexible circuit assembly onto the inner housing member using a plurality of arms of the positioning component after inserting the optical component into the at least one aperture. The automatic adhesive dispensing device 1040 may be configured as or otherwise support a means for applying, by an automatic adhesive dispensing device, a polymeric material to adhere the flexible circuit assembly to the inner housing member.

In some examples, the plurality of arms 1035 may be configured as or otherwise support a means for positioning a first edge of the one or more edges of the flexible circuit assembly onto the inner housing member using a first arm of the plurality of arms of the positioning component. In some examples, the automatic adhesive dispensing device 1040 may be configured as or otherwise support a means for adhering the first edge of the one or more edges of the flexible circuit assembly onto the inner housing member based at least in part on applying the polymeric material.

In some examples, the plurality of arms 1035 may be configured as or otherwise support a means for positioning a middle portion of the flexible circuit assembly onto the inner housing member using a second arm of the plurality of arms of the positioning component.

In some examples, the plurality of arms 1035 may be configured as or otherwise support a means for positioning a second edge of the one or more edges of the flexible circuit assembly onto the inner housing member using a third arm of the plurality of arms of the positioning component. In some examples, the automatic adhesive dispensing device 1040 may be configured as or otherwise support a means for adhering the second edge of the one or more edges of the flexible circuit assembly onto the inner housing member based at least in part on applying the polymeric material.

In some examples, the alignment component 1045 may be configured as or otherwise support a means for aligning the at least one aperture of the plurality of apertures of the inner housing member to the optical component of the plurality of optical components of the flexible circuit assembly based at least in part on a locking mechanism to lock the inner housing member in the radial orientation after rotating the inner housing member to the radial orientation.

In some examples, to support optical alignment process by the alignment component, the alignment component 1045 may be configured as or otherwise support a means for determining, by a video component of the manufacturing assembly, an initial radial orientation of the inner housing member relative to the optical component of the plurality of optical components of the flexible circuit assembly, wherein rotating the inner housing member to the radial orientation is based at least in part on determining the initial radial orientation of the inner housing member.

In some examples, the positioning component 1030 may be configured as or otherwise support a means for advancing the positioning component from the first position adjacent to the inner housing member to the second position, wherein inserting the optical component of the plurality of optical components of the flexible circuit assembly into the at least one aperture of the plurality of apertures of the inner housing member is based at least in part on advancing the positioning component of the manufacturing assembly.

In some examples, the light source 1050 may be configured as or otherwise support a means for applying a light source to the flexible circuit assembly to create a seal between the flexible circuit assembly and the inner housing member, wherein the light source is applied after applying the polymeric material.

In some examples, the rotational component 1025 may be configured as or otherwise support a means for rotating, by the rotational component, the inner housing member while applying the light source to the flexible circuit assembly.

In some examples, the rotational component 1025 may be configured as or otherwise support a means for rotating, by the rotational component, the inner housing member while applying the polymeric material to adhere the flexible circuit assembly to the inner housing member.

Figure 11:
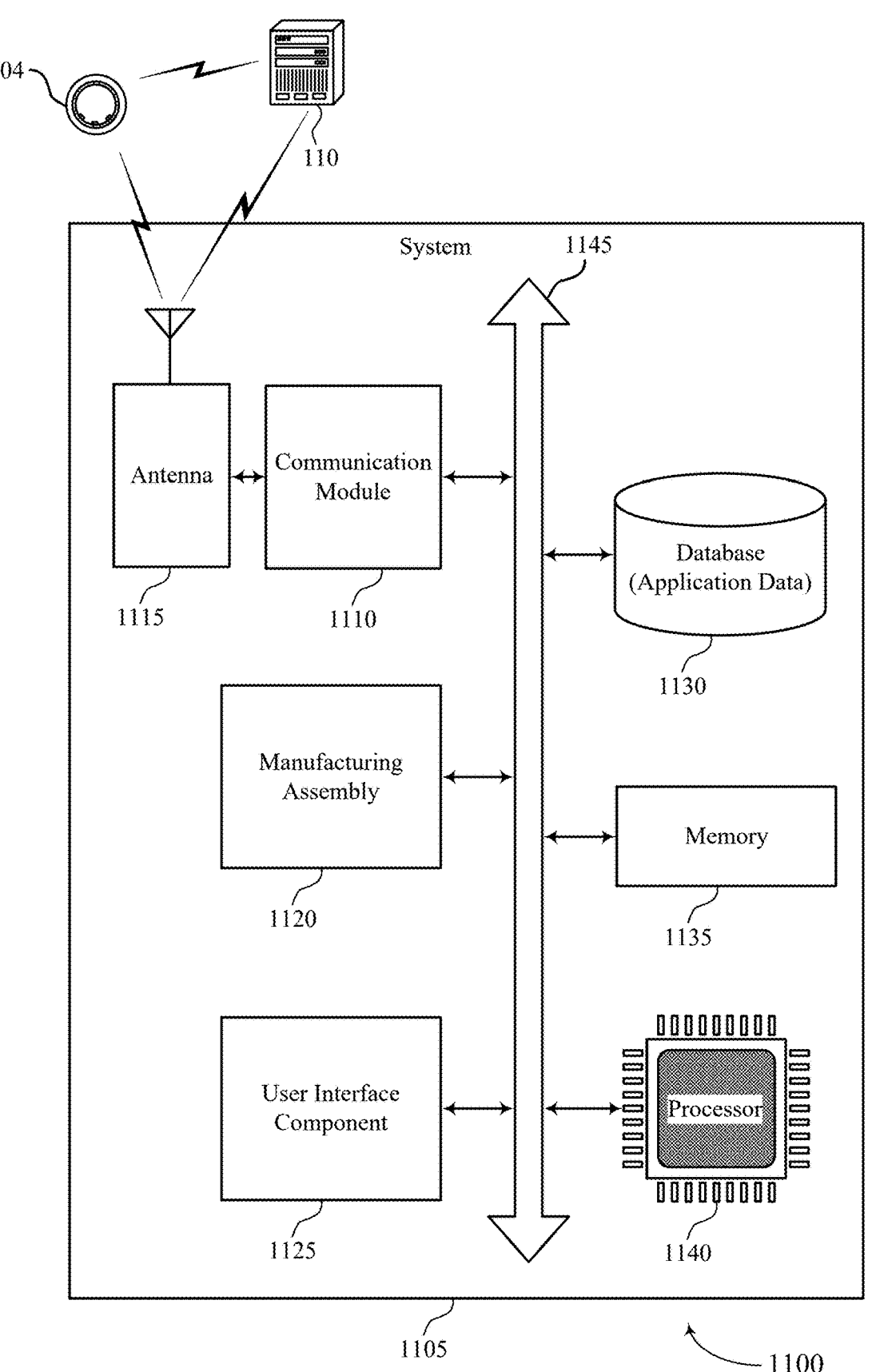
FIG. 11 shows a diagram of a system including a device that supports flex wrap circuit assembly techniques in accordance with aspects of the present disclosure.

FIG. 11 shows a diagram of a system 1100 including a system 1105 that supports flex wrap circuit assembly techniques in accordance with aspects of the present disclosure. The system 1105 may be an example of or include components of a system 905 as described herein. The system 1105 may include an example of a wearable device 104, as described previously herein. The system 1105 may include components for bi-directional communications including components for transmitting and receiving communications with a user device 106 and a server 110, such as a manufacturing assembly 1120, a communication module 1110, one or more antennas 1115, a user interface component 1125, a database (application data) 1130, at least one memory 1135, and at least one processor 1140. These components may be in electronic communication or otherwise coupled (e.g., operatively, communicatively, functionally, electronically, electrically) via one or more buses (e.g., a bus 1145).

The communication module 1110 may manage input and output signals for the system 1105 via the antenna 1115. The communication module 1110 may include an example of the communication module 220-*b* of the user device 106 shown and described in FIG. 2. In this regard, the communication module 1110 may manage communications with the ring 104 and the server 110, as illustrated in FIG. 2. The communication module 1110 may also manage peripherals not integrated into the system 1105. In some cases, the communication module 1110 may represent a physical connection or port to an external peripheral. In some cases, the communication module 1110 may utilize an operating system such as iOS®, ANDROID®, MS-DOS®, MS-WINDOWS®, OS/2®, UNIX®, LINUX®, or another known operating system. In other cases, the communication module 1110 may represent or interact with a wearable device (e.g., ring 104), modem, a keyboard, a mouse, a touchscreen, or a similar device. In some cases, the communication module 1110 may be implemented as part of the processor 1140. In some examples, a user may interact with the system 1105 via the communication module 1110, user interface component 1125, or via hardware components controlled by the communication module 1110.

In some cases, the system 1105 may include a single antenna 1115. However, in some other cases, the system 1105 may have more than one antenna 1115, which may be capable of concurrently transmitting or receiving multiple wireless transmissions. The communication module 1110 may communicate bi-directionally, via the one or more antennas 1115, wired, or wireless links as described herein. For example, the communication module 1110 may represent a wireless transceiver and may communicate bi-directionally with another wireless transceiver. The communication module 1110 may also include a modem to modulate the packets, to provide the modulated packets to one or more antennas 1115 for transmission, and to demodulate packets received from the one or more antennas 1115.

The user interface component 1125 may manage data storage and processing in a database 1130. In some cases, a user may interact with the user interface component 1125. In other cases, the user interface component 1125 may operate automatically without user interaction. The database 1130 may be an example of a single database, a distributed database, multiple distributed databases, a data store, a data lake, or an emergency backup database.

The memory 1135 may include RAM and ROM. The memory 1135 may store computer-readable, computer-executable software including instructions that, when executed, cause the processor 1140 to perform various functions described herein. In some cases, the memory 1135 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory 1135 to perform various functions (e.g., functions or tasks supporting a method and system for sleep staging algorithms).

For example, the manufacturing assembly 1120 may be configured as or otherwise support a means for rotating, by a rotational component of a manufacturing assembly, an inner housing member of the wearable ring device to a radial orientation based at least in part on an optical alignment process by an alignment component of the manufacturing assembly, wherein the inner housing member of the wearable ring device comprises a plurality of apertures. The manufacturing assembly 1120 may be configured as or otherwise support a means for inserting an optical component of the plurality of optical components of a flexible circuit assembly into at least one aperture of the plurality of apertures of the inner housing member by moving the flexible circuit assembly, via a positioning component of the manufacturing assembly, from a first position adjacent to the inner housing member to a second position on the inner housing member, wherein the optical component is aligned within the at least one aperture of the plurality of apertures based at least in part on inserting the optical component into the at least one aperture. The manufacturing assembly 1120 may be configured as or otherwise support a means for securing one or more edges of the flexible circuit assembly onto the inner housing member using a plurality of arms of the positioning component after inserting the optical component into the at least one aperture. The manufacturing assembly 1120 may be configured as or otherwise support a means for applying, by an automatic adhesive dispensing device, a polymeric material to adhere the flexible circuit assembly to the inner housing member.

By including or configuring the manufacturing assembly 1120 in accordance with examples as described herein, the system 1105 may support techniques for improved communication reliability, reduced latency, improved user experience related to reduced processing, reduced power consumption, more efficient utilization of communication resources, improved coordination between devices, longer battery life, improved utilization of processing capability.

The manufacturing assembly 1120 may include an application (e.g., "app"), program, software, or other component which is configured to facilitate communications with a ring 104, server 110, other user devices 106, and the like. For example, the manufacturing assembly 1120 may include an application executable on a user device 106 which is configured to receive data (e.g., physiological data) from a ring 104, perform processing operations on the received data, transmit and receive data with the servers 110, and cause presentation of data to a user 102.

FIG. 12 shows a flowchart illustrating a method 1200 that supports flex wrap circuit assembly techniques in accordance with aspects of the present disclosure. The operations of the method 1200 may be implemented by a manufacturing assembly or its components as described herein. For example, the operations of the method 1200 may be performed by a manufacturing assembly as described with reference to FIGS. 1 through 11. In some examples, a manufacturing assembly may execute a set of instructions to control the functional elements of the wearable device to perform the described functions. Additionally, or alternatively, the manufacturing assembly may perform aspects of the described functions using special-purpose hardware.

At 1205, the method may include rotating, by a rotational component of a manufacturing assembly, an inner housing member of the wearable ring device to a radial orientation based at least in part on an optical alignment process by an alignment component of the manufacturing assembly, wherein the inner housing member of the wearable ring device comprises a plurality of apertures. The operations of 1205 may be performed in accordance with examples as disclosed herein. In some examples, aspects of the operations of 1205 may be performed by a rotational component 1025 as described with reference to FIG. 10.

At 1210, the method may include inserting an optical component of the plurality of optical components of a flexible circuit assembly into at least one aperture of the plurality of apertures of the inner housing member by moving the flexible circuit assembly, via a positioning component of the manufacturing assembly, from a first position adjacent to the inner housing member to a second position on the inner housing member, wherein the optical component is aligned within the at least one aperture of the plurality of apertures based at least in part on inserting the optical component into the at least one aperture. The operations of 1210 may be performed in accordance with examples as disclosed herein. In some examples, aspects of the operations of 1210 may be performed by a positioning component 1030 as described with reference to FIG. 10.

At 1215, the method may include securing one or more edges of the flexible circuit assembly onto the inner housing member using a plurality of arms of the positioning component after inserting the optical component into the at least one aperture. The operations of 1215 may be performed in accordance with examples as disclosed herein. In some examples, aspects of the operations of 1215 may be performed by a plurality of arms 1035 as described with reference to FIG. 10.

At 1220, the method may include applying, by an automatic adhesive dispensing device of the manufacturing assembly, a polymeric material to adhere the flexible circuit assembly to the inner housing member. The operations of 1220 may be performed in accordance with examples as disclosed herein. In some examples, aspects of the operations of 1220 may be performed by an automatic adhesive dispensing device 1040 as described with reference to FIG. 10.

It should be noted that the methods described above describe possible implementations, and that the operations and the steps may be rearranged or otherwise modified and that other implementations are possible. Furthermore, aspects from two or more of the methods may be combined.

A method of manufacturing a wearable ring device comprising a plurality of optical components by manufacturing assembly is described. The method may include rotating, by a rotational component of a manufacturing assembly, an inner housing member of the wearable ring device to a radial orientation based at least in part on an optical alignment process by an alignment component of the manufacturing assembly, wherein the inner housing member of the wearable ring device comprises a plurality of apertures, inserting an optical component of the plurality of optical components of a flexible circuit assembly into at least one aperture of the plurality of apertures of the inner housing member by moving the flexible circuit assembly, via a positioning component of the manufacturing assembly, from a first position adjacent to the inner housing member to a second position on the inner housing member, wherein the optical component is aligned within the at least one aperture of the plurality of apertures based at least in part on inserting the optical component into the at least one aperture, securing one or more edges of the flexible circuit assembly onto the inner housing member using a plurality of arms of the positioning component after inserting the optical component into the at least one aperture, and applying, by an automatic adhesive dispensing device of the manufacturing assembly, a polymeric material to adhere the flexible circuit assembly to the inner housing member.

An apparatus is described. The apparatus may include one or more memories storing processor executable code, and one or more processors coupled with the one or more memories. The one or more processors may individually or collectively be operable to execute the code to cause the apparatus to rotate, by a rotational component of a manufacturing assembly, an inner housing member of the wearable ring device to a radial orientation based at least in part on an optical alignment process by an alignment component of the manufacturing assembly, wherein the inner housing member of the wearable ring device comprises a plurality of apertures, insert an optical component of the plurality of optical components of a flexible circuit assembly into at least one aperture of the plurality of apertures of the inner housing member by moving the flexible circuit assembly, via a positioning component of the manufacturing assembly, from a first position adjacent to the inner housing member to a second position on the inner housing member, wherein the optical component is aligned within the at least one aperture of the plurality of apertures based at least in part on inserting the optical component into the at least one aperture, secure one or more edges of the flexible circuit assembly onto the inner housing member using a plurality of arms of the positioning component after inserting the optical component into the at least one aperture, and apply, by an automatic adhesive dispensing device of the manufacturing assembly, a polymeric material to adhere the flexible circuit assembly to the inner housing member.

Another apparatus is described. The apparatus may include means for rotating, by a rotational component of a manufacturing assembly, an inner housing member of the wearable ring device to a radial orientation based at least in part on an optical alignment process by an alignment component of the manufacturing assembly, wherein the inner housing member of the wearable ring device comprises a plurality of apertures, means for inserting an optical component of the plurality of optical components of a flexible circuit assembly into at least one aperture of the plurality of apertures of the inner housing member by moving the flexible circuit assembly, via a positioning component of the manufacturing assembly, from a first position adjacent to the inner housing member to a second position on the inner housing member, wherein the optical component is aligned within the at least one aperture of the plurality of apertures based at least in part on inserting the optical component into the at least one aperture, means for securing one or more edges of the flexible circuit assembly onto the inner housing member using a plurality of arms of the positioning component after inserting the optical component into the at least one aperture, and means for applying, by an automatic adhesive dispensing device of the manufacturing assembly, a polymeric material to adhere the flexible circuit assembly to the inner housing member.

A non-transitory computer-readable medium storing code is described. The code may include instructions executable by one or more processors to rotate, by a rotational component of a manufacturing assembly, an inner housing member of the wearable ring device to a radial orientation based at least in part on an optical alignment process by an alignment component of the manufacturing assembly, wherein the inner housing member of the wearable ring device comprises a plurality of apertures, insert an optical component of the plurality of optical components of a flexible circuit assembly into at least one aperture of the plurality of apertures of the inner housing member by moving the flexible circuit assembly, via a positioning component of the manufacturing assembly, from a first position adjacent to the inner housing member to a second position on the inner housing member, wherein the optical component is aligned within the at least one aperture of the plurality of apertures based at least in part on inserting the optical component into the at least one aperture, secure one or more edges of the flexible circuit assembly onto the inner housing member using a plurality of arms of the positioning component after inserting the optical component into the at least one aperture, and apply, by an automatic adhesive dispensing device of the manufacturing assembly, a polymeric material to adhere the flexible circuit assembly to the inner housing member.

Some examples of the method, apparatus, and non-transitory computer-readable medium described herein may further include operations, features, means, or instructions for positioning a first edge of the one or more edges of the flexible circuit assembly onto the inner housing member using a first arm of the plurality of arms of the positioning component and adhering the first edge of the one or more edges of the flexible circuit assembly onto the inner housing member based at least in part on applying the polymeric material.

Some examples of the method, apparatus, and non-transitory computer-readable medium described herein may further include operations, features, means, or instructions for positioning a middle portion of the flexible circuit assembly onto the inner housing member using a second arm of the plurality of arms of the positioning component.

Some examples of the method, apparatus, and non-transitory computer-readable medium described herein may further include operations, features, means, or instructions for positioning a second edge of the one or more edges of the flexible circuit assembly onto the inner housing member using a third arm of the plurality of arms of the positioning component and adhering the second edge of the one or more edges of the flexible circuit assembly onto the inner housing member based at least in part on applying the polymeric material.

Some examples of the method, apparatus, and non-transitory computer-readable medium described herein may further include operations, features, means, or instructions for aligning the at least one aperture of the plurality of apertures of the inner housing member to the optical component of the plurality of optical components of the flexible circuit assembly based at least in part on a locking mechanism to lock the inner housing member in the radial orientation after rotating the inner housing member to the radial orientation.

In some examples of the method, apparatus, and non-transitory computer-readable medium described herein, the optical alignment process by the alignment component may include operations, features, means, or instructions for determining, by a video component of the manufacturing assembly, an initial radial orientation of the inner housing member relative to the optical component of the plurality of optical components of the flexible circuit assembly, wherein rotating the inner housing member to the radial orientation may be based at least in part on determining the initial radial orientation of the inner housing member.

Some examples of the method, apparatus, and non-transitory computer-readable medium described herein may further include operations, features, means, or instructions for advancing the positioning component from the first position adjacent to the inner housing member to the second position, wherein inserting the optical component of the plurality of optical components of the flexible circuit assembly into the at least one aperture of the plurality of apertures of the inner housing member may be based at least in part on advancing the positioning component of the manufacturing assembly.

Some examples of the method, apparatus, and non-transitory computer-readable medium described herein may further include operations, features, means, or instructions for applying a light source to the flexible circuit assembly to create a seal between the flexible circuit assembly and the inner housing member, wherein the light source may be applied after applying the polymeric material.

Some examples of the method, apparatus, and non-transitory computer-readable medium described herein may further include operations, features, means, or instructions for rotating, by the rotational component, the inner housing member while applying the light source to the flexible circuit assembly.

A manufacturing assembly is described. The manufacturing assembly may include a rotational component configured to rotate an inner housing member of a wearable ring device to a radial orientation, wherein the inner housing member comprises a plurality of apertures, an alignment component configured to position the inner housing member in the radial orientation based at least in part on an optical alignment process, a positioning component configured to move a flexible circuit assembly from a first position adjacent to the inner housing member to a second position on the inner housing member such that an optical component of a plurality of optical components of the flexible circuit assembly is inserted into at least one aperture of the plurality of apertures of the inner housing member, wherein the optical component is aligned within the at least one aperture of the plurality of apertures based at least in part on inserting the optical component into the at least one aperture, wherein the positioning component further comprises, a plurality of arms comprising one or more actuating features that are configured to secure one or more edges of the flexible circuit assembly onto the inner housing member, and an automatic adhesive dispensing device of the manufacturing assembly configured to apply a polymeric material to adhere the flexible circuit assembly to the inner housing member.

Some examples of the manufacturing assembly may further include a first arm of the plurality of arms that comprises a first actuating feature of the one or more actuating features that may be configured to position a first edge of the one or more edges of the flexible circuit assembly onto the inner housing member by advancing the first arm in a first direction to move the first edge from the first position adjacent to the inner housing member to the second position on the inner housing member.

Some examples of the manufacturing assembly may further include a second arm of the plurality of arms that comprises a second actuating feature of the one or more actuating features that may be configured to position a middle portion of the flexible circuit assembly onto the inner housing member by advancing the second arm in the first direction to move the middle portion from the first position adjacent to the inner housing member to the second position on the inner housing member.

Some examples of the manufacturing assembly may further include a third arm of the plurality of arms that comprises a third actuating feature of the one or more actuating features that may be configured to position a second edge of the one or more edges of the flexible circuit assembly onto the inner housing member by advancing the third arm in a second direction perpendicular to the first direction to move the second edge from the first position adjacent to the inner housing member to the second position on the inner housing member.

In some examples of the manufacturing assembly, the alignment component further comprises a locking mechanism configured to lock the inner housing member in the radial orientation after rotating the inner housing member to the radial orientation, wherein locking the inner housing member in the radial orientation aligns the at least one aperture of the plurality of apertures of the inner housing member to the optical component of the plurality of optical components of the flexible circuit assembly.

In some examples of the manufacturing assembly, the alignment component further comprises a video component configured to determine an initial radial orientation of the inner housing member relative to the optical component of the plurality of optical components of the flexible circuit assembly, wherein rotating the inner housing member to the radial orientation may be based at least in part on determining the initial radial orientation of the inner housing member.

In some examples of the manufacturing assembly, the positioning component may be configured to be advanced from the first position adjacent to the inner housing member to the second position and inserting the optical component of the plurality of optical components of the flexible circuit assembly into the at least one aperture of the plurality of apertures of the inner housing member may be based at least in part on advancing the positioning component of the manufacturing assembly.

Some examples of the manufacturing assembly may further include a light source configured to apply a light to the flexible circuit assembly to create a seal between the flexible circuit assembly and the inner housing member, wherein the light source may be applied after applying the polymeric material.

In some examples of the manufacturing assembly, the rotational component may be configured to rotate the inner housing member while the light source applies the light to the flexible circuit assembly, while the automatic adhesive dispensing device of the manufacturing assembly applies the polymeric material, or both.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of manufacturing a wearable ring device comprising a plurality of optical components, comprising:
   rotating, by a rotational component of a manufacturing assembly, an inner housing member of the wearable ring device to a radial orientation based at least in part on an optical alignment process by an alignment component of the manufacturing assembly, wherein the inner housing member of the wearable ring device comprises a plurality of apertures;
   inserting an optical component of the plurality of optical components of a flexible circuit assembly into at least one aperture of the plurality of apertures of the inner housing member by moving the flexible circuit assembly, via a positioning component of the manufacturing assembly, from a first position adjacent to the inner housing member to a second position on the inner housing member, wherein the optical component is aligned within the at least one aperture of the plurality of apertures based at least in part on inserting the optical component into the at least one aperture;
   securing one or more edges of the flexible circuit assembly onto the inner housing member using a plurality of arms of the positioning component after inserting the optical component into the at least one aperture; and
   applying, by an automatic adhesive dispensing device of the manufacturing assembly, a polymeric material to adhere the flexible circuit assembly to the inner housing member.

2. The method of claim 1, further comprising:
   positioning a first edge of the one or more edges of the flexible circuit assembly onto the inner housing member using a first arm of the plurality of arms of the positioning component; and
   adhering the first edge of the one or more edges of the flexible circuit assembly onto the inner housing member based at least in part on applying the polymeric material.

3. The method of claim 1, further comprising:
   positioning a second edge of the one or more edges of the flexible circuit assembly onto the inner housing member using a third arm of the plurality of arms of the positioning component; and adhering the second edge of the one or more edges of the flexible circuit assembly onto the inner housing member based at least in part on applying the polymeric material.

4. The method of claim 1, further comprising:

aligning the at least one aperture of the plurality of apertures of the inner housing member to the optical component of the plurality of optical components of the flexible circuit assembly based at least in part on a locking mechanism to lock the inner housing member in the radial orientation after rotating the inner housing member to the radial orientation.

5. The method of claim 1, wherein the optical alignment process by the alignment component further comprises:

determining, by a video component of the manufacturing assembly, an initial radial orientation of the inner housing member relative to the optical component of the plurality of optical components of the flexible circuit assembly, wherein rotating the inner housing member to the radial orientation is based at least in part on determining the initial radial orientation of the inner housing member.

6. The method of claim 1, further comprising:

advancing the positioning component from the first position adjacent to the inner housing member to the second position, wherein inserting the optical component of the plurality of optical components of the flexible circuit assembly into the at least one aperture of the plurality of apertures of the inner housing member is based at least in part on advancing the positioning component of the manufacturing assembly.

7. The method of claim 1, further comprising:

applying a light source to the flexible circuit assembly to create a seal between the flexible circuit assembly and the inner housing member, wherein the light source is applied after applying the polymeric material.

8. The method of claim 7, further comprising:

rotating, by the rotational component, the inner housing member while applying the light source to the flexible circuit assembly.

9. The method of claim 1 further comprising:

positioning a middle portion of the flexible circuit assembly onto the inner housing member using a second arm of the plurality of arms of the positioning component.

10. The method of claim 1, further comprising:

rotating, by the rotational component, the inner housing member while applying the polymeric material to adhere the flexible circuit assembly to the inner housing member.

\* \* \* \* \*